(12) United States Patent
Herring

(10) Patent No.: US 9,107,545 B1
(45) Date of Patent: Aug. 18, 2015

(54) ONE PIECE SHOWER PAN AND METHOD OF MAKING SAME

(76) Inventor: Avery S. Herring, Petal, MS (US)

(*) Notice: Subject to any disclaimer, the term of this patent is extended or adjusted under 35 U.S.C. 154(b) by 445 days.

(21) Appl. No.: 12/687,508

(22) Filed: Jan. 14, 2010

(51) Int. Cl.
*A47K 3/40* (2006.01)

(52) U.S. Cl.
CPC .................................. *A47K 3/40* (2013.01)

(58) Field of Classification Search
CPC ........................................................ A47K 3/40
USPC ................ 4/612–614, 584, 595; 52/35, 302.1
See application file for complete search history.

(56) References Cited

U.S. PATENT DOCUMENTS

| | | | |
|---|---|---|---|
| 3,987,714 A * | 10/1976 | Campbell | 454/296 |
| 4,541,132 A | 9/1985 | Long | |
| 5,845,347 A | 12/1998 | Young | |
| 5,911,518 A | 6/1999 | Jurek et al. | |
| 5,913,777 A | 6/1999 | Gerber | |
| 6,003,169 A | 12/1999 | Davis, Jr. | |
| 6,014,780 A | 1/2000 | Jurek et al. | |
| 6,301,725 B1 * | 10/2001 | Harvey | 4/611 |
| 6,777,063 B2 | 8/2004 | Born | |
| 6,851,133 B1 | 2/2005 | Nehring | |
| 6,990,695 B2 | 1/2006 | Grayson | |
| 7,296,309 B2 | 11/2007 | Nehring | |
| 7,562,495 B1 * | 7/2009 | Fairchild et al. | 52/35 |
| 8,112,831 B2 * | 2/2012 | Cook | 4/613 |
| 8,181,288 B1 * | 5/2012 | Davis, Jr. | 4/613 |
| 2004/0205890 A1 * | 10/2004 | Smale | 4/613 |
| 2006/0183387 A1 | 8/2006 | Taylor et al. | |
| 2007/0042828 A1 * | 2/2007 | Krushke et al. | 472/92 |
| 2008/0016614 A1 | 1/2008 | Daniels | |
| 2009/0100769 A1 * | 4/2009 | Barrett et al. | 52/35 |
| 2009/0307835 A1 * | 12/2009 | Anastasi Vavvessi | 4/584 |

FOREIGN PATENT DOCUMENTS

DE   19945056 C1   11/2000

* cited by examiner

*Primary Examiner* — Janie Christiansen
(74) *Attorney, Agent, or Firm* — Garvey, Smith, Nehrbass & North, L.L.C.; Gregory C. Smith; Julia M. FitzPatrick

(57) ABSTRACT

A one piece shower drain pan, encapsulated in a water proof membrane, and the method of fabricating the one piece open drain shower pan, the method which includes providing extruded polystyrene (XPS) foam of the type which absorbs very little water; shaping the section of extruded polystyrene foam with a CNC router to obtain the desired slope in the floor; cutting a hole in the foam to produce the drain hole; cutting a curb from the XPS foam and gluing the foam to a pan base on the open sides. Splash walls are then cut from concrete wall board and glued to the sides having no curb, so that the glue serves as a bonding agent and provides a waterproof seal between the parts; after the glue has cured, spraying the entire pan assembly with a polyurethane or polyurea coating to completely encapsulate the entire pan with a waterproof membrane, which provides strength and rigidity and defines a one piece drain pan ready for installation.

13 Claims, 3 Drawing Sheets

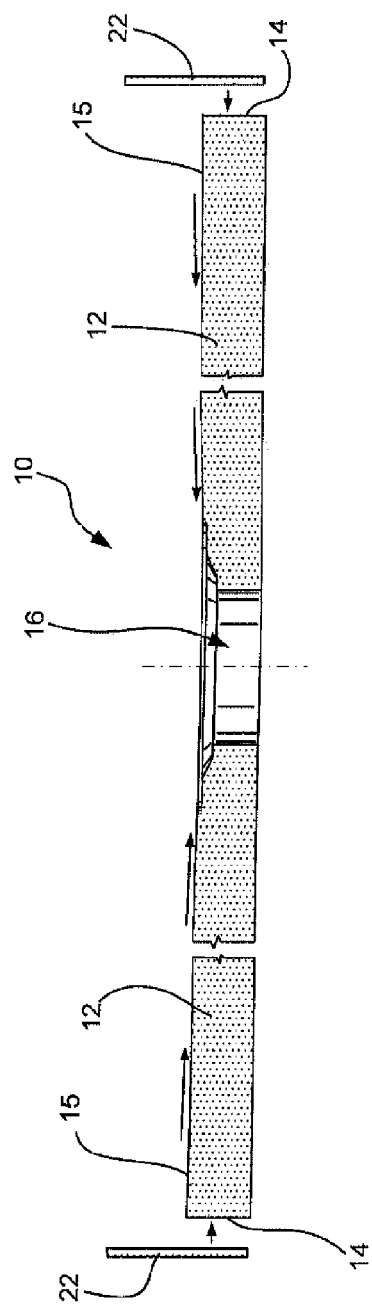
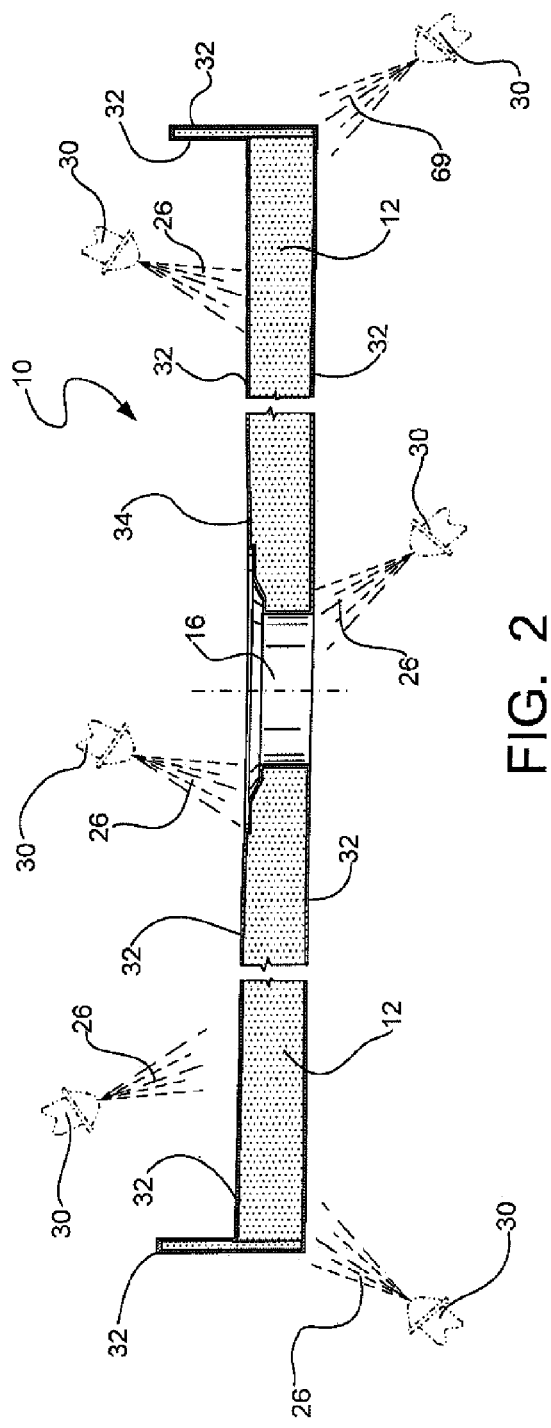

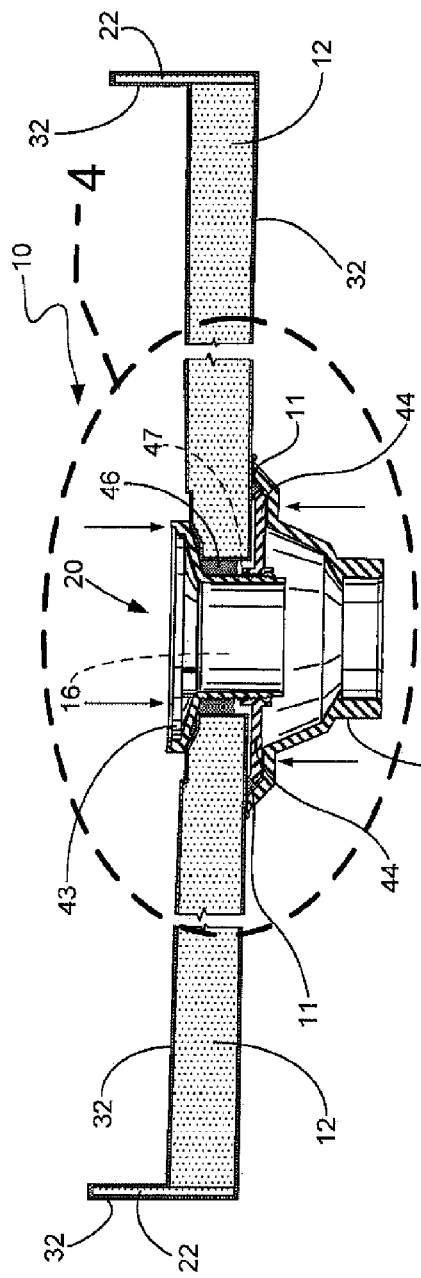
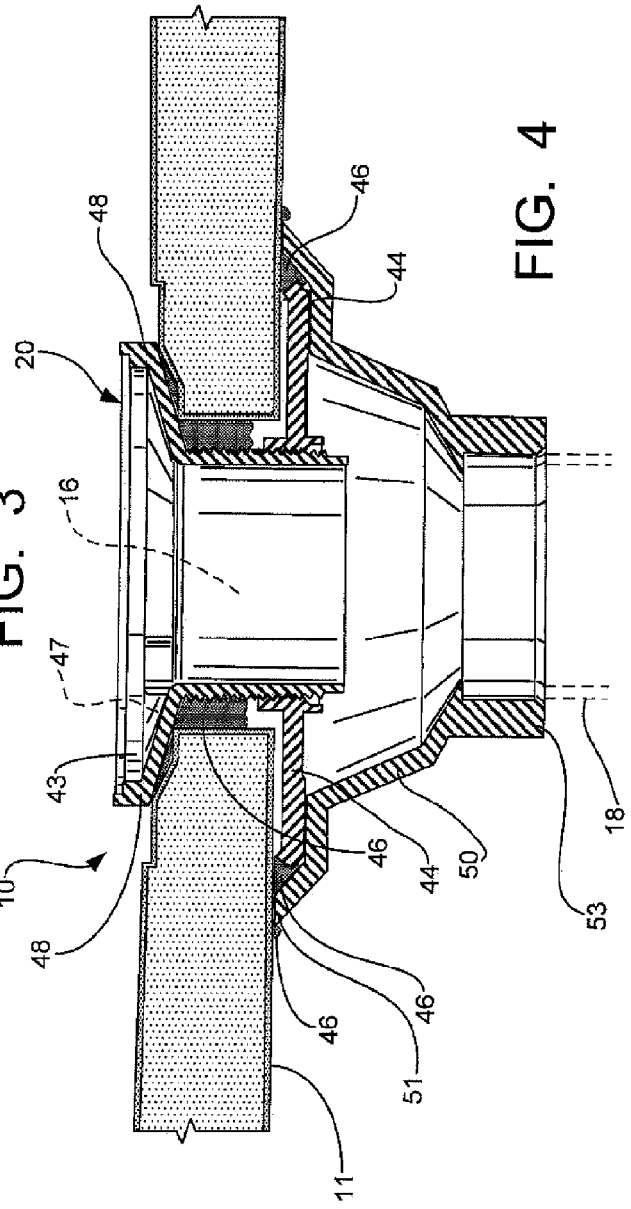

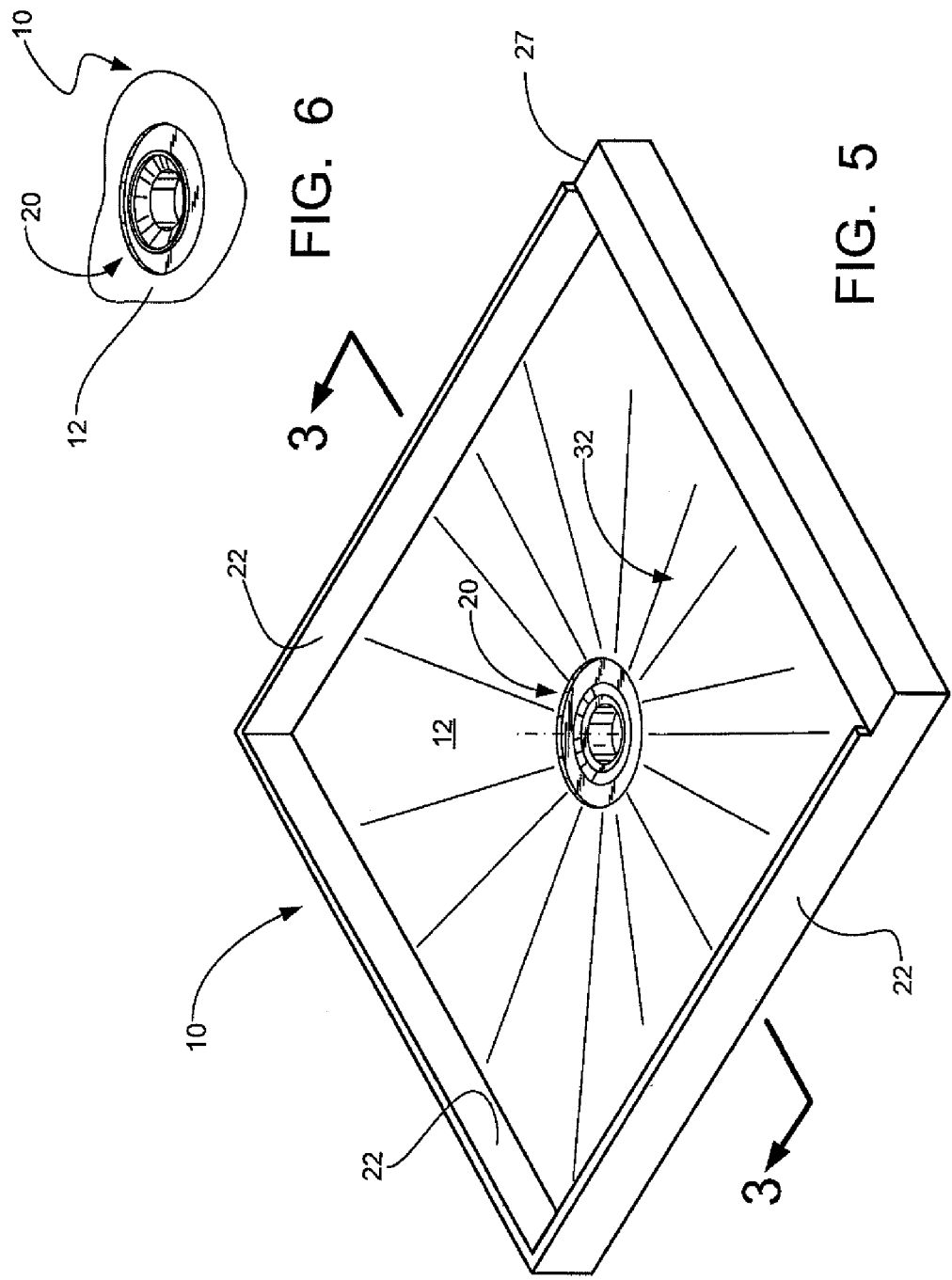

ONE PIECE SHOWER PAN AND METHOD OF MAKING SAME

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to shower pans. More particularly, the present invention relates to a shower pan and a method of fabricating same, wherein the shower pan when completed exists as a one piece unit ready for installation.

2. General Background of the Invention

In the general field of shower pans, it is a continuing problem that the shower pan which is easy to install and after installation is able to resist water and be leak proof.

Applicant is providing an Information Disclosure Statement herewith which lists numerous prior art patents which may be pertinent to the patentability of the present invention.

U.S. Pat. No. 6,003,169 discloses a prefabricated shower pan having an acrylic based solid upper layer, a polystyrene foam layer, and a durable, rigid planar base layer.

U.S. Pat. No. 6,777,063 discloses a backerboard having a shaped cut or groove that allows bending of the backerboard into an L-shaped corner with a rounded out surface and sharp inner surface.

U.S. Patent Publication No. 2006/0183387 discloses a composite board for tile which includes outer reinforcement portions and a polystyrene layer disposed between the two outer reinforcement layers.

Foreign Patent No. DE19945056 discloses a process for locating a bath tub or shower tray, over a water outlet pipe using a carrier with surrounding side walls and a waste pipe outlet section.

U.S. Patent Publication No. 2008/0016614 discloses a modular shower pan which includes at least four polygon panels adapted to interlock in side by side relation to form a body; with each panel having a planar bottom surface and a sloped top surface.

U.S. Pat. No. 7,296,309 discloses a method of constructing a shower enclosure support structure which decreases the probability of mold growth by utilizing interior and/or exterior corner directional flow flashings between the joint.

U.S. Pat. No. 6,647,565 discloses a method of constructing a surface for drainage, and a kit of parts forming components required to produce such a drainage surface.

U.S. Pat. No. 5,845,347 discloses a shower pan which forms a base of a shower and is capable of being built in various sloping configurations.

| | | |
|---|---|---|
| 4,541,132 | Shower Pan | Sep. 17, 1985 |
| 5,845,347 | Method of Manufacturing Shower Foundation | Dec. 8, 1998 |
| 5,911,518 | Shower Bath and Drain | Jun. 15, 1999 |
| 5,913,777 | Pre-Fabricated Shower Module and Method of Shower Construction | Jun. 22, 1999 |
| 6,003,169 | Solid Surface Shower Pan | Dec. 21, 1999 |
| 6,014,780 | Shower Bath and Drain | Jan. 18, 2000 |
| 6,777,063 | Composite Backerboard for Bullnose Support | Aug. 17, 2004 |
| 6,851,133 | Mold Resistant Shower Enclosure | Feb. 8, 2005 |
| 6,990,695 | Shower Pan | Jan. 31, 2006 |
| 7,296,309 | Leak Proof Shower Enclosure Support Structure | Nov. 20, 2007 |
| U.S. 2006/0183387 | Composite Board | Aug. 17, 2006 |
| U.S. 2008/0016614 | Modular Shower Pan | Jan. 24, 2008 |
| DE 19945056 C1 | Bath or Shower Tray Location on a Carrier, Comprises Placing the Edge of the Bath or Tray into a Carrier Groove and then Filling the Latter and the Uncovered area with a Sealant | Nov. 16, 2000 |

BRIEF SUMMARY OF THE INVENTION

The present invention solves the problems in the art in a simple and straightforward manner. What is provided is a one piece drain pan, encapsulated in a water proof membrane, and the method of fabricating the one piece open drain shower pan, the method which includes providing extruded polystyrene (XPS) foam of the type which absorbs very little or no water; shaping the section of extruded polystyrene foam with a CNC router to obtain the desired slope in the floor; cutting a hole in the foam to produce the drain hole; cutting a curb from the XPS foam and gluing the foam to a pan base on the open sides. Splash walls are then cut from concrete wall board and glued to the sides having no curb, so that the glue serves as a bonding agent and provides a waterproof seal between the parts; after the glue has cured, spraying the entire pan assembly with a polyurethane or polyurea coating to completely encapsulate the entire pan with a waterproof membrane, which provides strength and rigidity and defines a one piece drain pan ready for installation.

Therefore, it is a principal object of the present invention to provide a drain pan having a body of XPS foam, which after assembled, is completed encapsulated with a waterproof membrane polyurethane or polyurea which results in a one-piece, rigid and water proof tilable shower pan.

It is another principal object of the present invention to provide a method of constructing a drain pan by providing a body section of XPS foam, which after it is shaped and assembled, is sprayed and completely encapsulated with a waterproof membrane of polyurethane or polyurea which results in a one-piece, rigid and water proof tileable shower pan.

These and other aspects and advantages will become more apparent after careful consideration is given to the following detailed description of the preferred exemplary embodiments thereof.

BRIEF DESCRIPTION OF THE SEVERAL VIEWS OF THE DRAWINGS

Reference will hereinafter be made to the accompanying drawings, wherein like reference numerals throughout the various FIGURES denote like structural elements, and wherein;

FIG. 1 is a cross-section view of the high density XPS core of the one-piece shower drain of the present invention;

FIG. 2 is a cross-section view of the process of encapsulating the high density XPS core of the one-piece shower drain of the present invention with a layer of polyurethane or polyurea;

FIG. 3 is a cross-section view along lines 3-3 in FIG. 5 of the one-piece shower drain of the present invention;

FIG. 4 is a blow-up of the central drain assembly shown in FIG. 3 of the one-piece shower drain of the present invention;

FIG. 5 is an overall perspective view of the fully assembled one-piece shower drain of the present invention; and FIG. 6 is an isolated view of the central drain portion of the one-piece shower drain of the present invention.

DETAILED DESCRIPTION OF THE INVENTION

FIGS. 1 through 6 illustrate the preferred embodiment of the one-piece open drain shower pan of the present invention by the numeral 10. As illustrated more particularly in FIGS. 1 through 4, the assembled one-piece shower drain pan 10, also referred to as pan assembly 10, comprises a high density XPS foam core 12, generally rectangular or square in nature, but can be any shape and any size to serve as the floor to a bathroom shower. XPS core 12, as illustrated in cross-section view in FIG. 1, is approximately 1½ to 2 inches in thickness at it's outed edges 14, and in its fabrication, in a process which will be discussed further, the upper surface 15 of core 12 is tapered toward the drain opening 16 so that when installed, water flows toward the drain opening 16 and down a drain pipe 18 (phantom view in FIG. 4). As further illustrated in FIG. 3, the drain opening 16 is also configured to allow a drain assembly 20 to be positioned therein, as will be discussed further. FIG. 1 also illustrates a view of the splash walls 22, which are cut from concrete wall board ¼" in thickness, and which will be placed around the edges not open for a curb 14 of the pan 10. The other edge or edges 14 would include a curb 27 for entry into the shower, and as seen in composite view in FIG. 5, to define the assembled shower drain pan 10.

The drain pan assembly 10, which includes the splash walls 22 glued in place, would then be encapsulated with a layer of polyurethane or polyurea 26 which would define the one-piece, waterproof shower pan 10 of the present invention. As seen in FIG. 2, this is accomplished by moving the assembled drain pan assembly 10 through a series of spray nozzles 30. However, in the preferred embodiment there may be a single, hand-held spray gun to emit the polyurethane fluid 26, so that each nozzle 30 would emit the polyurethane or polyurea fluid 26 and would form a coating 32 over the entire outer surface 34 of the drain pan 10, which would provide the one-piece, waterproof shower drain pan 10, which would also provide greater strength and rigidity to the drain pan 10.

As seen in side view in FIGS. 3 and 4, there is illustrated first in FIG. 3, a cross-section view of the entire shower pan 10, which includes the splash walls 22 and the drain assembly 20. This assembly 20 includes an upper drain portion 48, inserted within drain pan opening 16, and secured in place with a threaded plate 44 which is bolted into underside 11 of the drain pan assembly 10. There is provided a layer of waterproof sealant 46 in the space 47 between the drain pan assembly 10 and the plastic drain portion 48 of the drain assembly 20. Further, to insure water tight security between the upper drain portion 43 and the drain pan assembly 10, there is provided waterproof sealant 46, to fill the gap between the plastic drain 48 and the shower pan 10. On the underside of the bottom plate 44 there is secured a drain body 50 which would connect at its lower end 53 to the drain pipe 18 (phantom view). There is also provided a layer of sealant material 46 between the upper edge 51 of drain body 50 and the underside 11 of the drain pan assembly 10. These structures are more clearly identified in the blowup view of the drain assembly 20.

As identified earlier, FIG. 5 illustrates an overall perspective view of the drain pan assembly 10 of the present invention, showing the three splash walls 22 glued to the XPS core 12, which has been sprayed with the polyurethane coating 32, which would make it a single, water-proof drain pan assembly 10. There is further illustrated the curb 27 which allows entry and exit of the shower when the drain pan assembly 10 is installed in a shower. Although the curb and splash walls could be larger or smaller, in the preferred embodiment, the curb 27 would be four inches high and four inches deep, while the three splash walls 22 would be 4½ inches in height. The assembly 10 also includes the drain assembly 20, in place, in the manner as described with reference to FIGS. 3 and 4. FIG. 6 illustrates an isolated overall view of the drain assembly 20 as it would be installed into the drain pan assembly 10.

As explained earlier, in the process to provide the one piece assembly 10 to the customer, as a one piece drain pan 10 encapsulated in a polyurethane water proof coating 32, the method includes the steps of providing a one piece section XPS foam core 12 of the type which absorbs very little or no water; shaping the section of extruded polystyrene foam 12 with a CNC router to obtain the desired slope in the upper surface 15, to define the floor; cutting the central hole 16 in the foam 12 to serve as the drain opening; cutting the curb 27 from the XPS foam 12 and gluing the foam 12 to a pan base on the open sides. Splash walls 22 are then cut from concrete wall board and glued to the edges 14 having no curb 27, so that the glue serves as a bonding agent and provides a waterproof seal between the parts. After the glue has cured, spraying the entire pan assembly 10 with a polyurethane or polyurea coating 32 to completely encapsulate the entire pan 10 with a waterproof membrane 32, which provides strength and rigidity and defines a one piece drain pan 10 ready for installation at the site by the installer. The drain pan assembly 10 is then installed onto the shower space.

To help guide through the shower pan installation process, there is provided the following Installation Guide, which is intended to provide an easy to follow step-by-step process for the installation of one piece shower pan 10.

In the installation process, what follows are the preferred instructions for installing the ITS shower pan.

1. Sweep and clean any debris from the shower stall floor space.

2. Test fit the 3-piece drain provided with the shower pan 10 to make sure that the top of the main section of the drain finishes out about 1/16 to 1/8 of an inch above the slab or sub floor. (Drain pipe should be cut approx. 1 13/16" below surface of slab or sub floor) If it does not fit, make necessary adjustments in order to achieve the correct finishing height.

3. Test fit the shower pan to make sure of proper fit of the pan and the drain location. Remove the pan after test fitting is complete.

4. Attach the 3-piece drain to the drainpipe using the industry recommended adhesive. After attachment, remove the height adjustable piece of the drain.

5. Place two (2) ¾"x¾" or larger boards on the floor to the slide the pan into place.

6. Apply thin-set adhesive (latex modified rapid setting material is recommended) using a ½" square notch trowel to the slab or sub floor, making sure to apply the adhesive all the way to the edge of the 3-piece drain. It is not necessary under the wooden slides.

7. Apply a ½" bead of caulk to the rim of the main piece of the 3-piece drain.

8. Carefully slide the tilable shower pan into place and remove the wooden slides. Once in place, apply pressure to the shower pan to ensure a proper seal with the thin-set and caulk. Using a level, make certain that the shower pan is level on all sides in order to ensure proper water drainage.

9. Apply a liberal bead of caulk around the opening for the drain and then insert the adjustable drain piece and hand tighten this piece to the rest of the drain. Remove the excess caulk around the edge of the drain.

10. Allow the thin-set to dry to manufacturers recommendations before continuing.

11. It is now ready to hang Backer Board in the shower. Before securing the backer board to the studs, apply a bead of caulk to the top edge of the shower pan splash Walls and allow the backer board to rest on the top edge of the shower pan.

12. Once completed, one should always waterproof all seams within the shower space.

13. The installer is now ready to begin laying tile.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The following is a list of parts and materials suitable for use in the present invention.

PARTS LIST

| Part Number | Description |
| --- | --- |
| 10 | drain shower pan |
| 11 | underside |
| 12 | high density XPS core |
| 14 | outer edges |
| 15 | upper surface |
| 16 | drain opening |
| 18 | drain pipe |
| 20 | drain assembly |
| 22 | splash walls |
| 26 | polyurethane/polyurea |
| 27 | curb |
| 30 | spray nozzles |
| 32 | coating |
| 34 | outer surface |
| 40 | central drain assembly |
| 43 | drain top |
| 44 | threaded bottom plate |
| 46 | tile sealant |
| 47 | space |
| 48 | plastic drain portion |
| 50 | drain body |
| 51 | upper edge |
| 53 | lower end |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A one-piece shower pan assembly, comprising:
   a. a section of extruded foam having a generally flat bottom surface and an upper surface sloping to a central drain hole;
   b. a curb formed of the extruded foam;
   c. splash walls of concrete wall board of a ¼" thickness glued to sides of the section of extruded foam;
   d. an outermost layer of polyurethane for encapsulating and strengthening the section of extruded foam, the curb formed of the extruded foam and the splash walls of concrete wall board glued to the sides of the section of extruded foam to define the one-piece shower pan assembly; and
   e. wherein a bottom portion of the one piece shower pan assembly consists of the generally flat bottom surface of the section of extruded foam encapsulated by the outermost layer of polyurethane.

2. The assembly in claim 1, wherein the extruded foam comprises extruded polystyrene (XPS) foam.

3. The assembly in claim 1, wherein the extruded foam absorbs little or no water.

4. The assembly in claim 1, wherein the layer of polyurethane does not encapsulate the elements a, b, and c until all glue has cured.

5. The assembly in claim 1, wherein the polyurethane layer defines a means to cover and is sprayed over the entire assembly to define a waterproof and rigid membrane.

6. A one-piece shower pan assembly comprising:
   a. a section of extruded polystyrene (XPS) foam having a generally flat bottom surface and an upper surface sloping to and terminating at a central drain hole;
   b. a curb formed secured to a wall of the section of the XPS foam;
   c. splash walls of concrete wall board of ¼" thickness glued to sides of the section of the XPS foam;
   d. a drain assembly for positioning within the central drain hole and a layer of sealant for filling gaps between the drain assembly and one-piece shower pan assembly;
   e. an outermost layer of polyurethane sprayed to the combination of the section of extruded foam, the curb formed of the extruded foam and the splash walls of concrete wall board glued to the sides of the section of extruded foam in order to encapsulate and add rigidity to the assembly to define the one-piece shower pan; and
   f. wherein the generally flat bottom surface of the section of extruded foam encapsulated by the outermost layer of polyurethane defines a base for the one-piece shower pan.

7. The assembly in claim 6, wherein the encapsulating layer may comprise polyurea.

8. The assembly in claim 6, wherein the layer of polyurethane defines a waterproof membrane to encapsulate and add rigidity to the entire assembly.

9. The assembly in claim 6, wherein the encapsulating layer is applied by a single or a plurality of spray nozzles.

10. A method of fabricating a one-piece shower pan assembly, comprising steps of:
   a. providing a section of extruded polystyrene (XPS) foam having a generally flat bottom surface and a central opening;
   b. sloping an upper surface of the section of the XPS foam toward and terminating at the central opening;
   c. providing a curb formed of the XPS foam and gluing the curb to a side of the section of XPS foam;
   d. gluing splash walls of concrete wall board of no greater than ¼" thickness to at least three other sides of the section of XPS foam;
   e. providing a drain assembly for positioning within the central opening and providing a layer of sealant to fill gaps between the drain assembly and one-piece shower pan assembly; and
   f. encapsulating the section of extruded polystyrene (XPS) foam, the curb glued to a side of the section of XPS foam and the splashwalls of concrete wall board glued to at least the three other sides of the section of XPS foam with an outermost layer of polyurethane for providing rigidity and to define the one-piece shower pan; and g. wherein a bottom of the one-piece shower pan assembly consists of the generally flat bottom surface of the section of extruded polystyrene (XPS) foam encapsulated by the outermost layer of polyurethane.

11. The method in claim 10, wherein the extruded foam comprises XPS polystyrene foam.

12. The method in claim 10, wherein the encapsulating material in step e may comprise polyurea.

13. The method in claim 10, wherein the upper surface of the XPS foam is sloped with the use of a CNC router.

* * * * *